United States Patent [19]

Everett

[11] Patent Number: 4,515,935
[45] Date of Patent: May 7, 1985

[54] CATALYSTS FOR FOUNDRY CORE BINDERS

[75] Inventor: George S. Everett, Clarendon Hills, Ill.

[73] Assignee: QO Chemicals, Inc., Chicago, Ill.

[21] Appl. No.: 623,698

[22] Filed: Jun. 22, 1984

Related U.S. Application Data

[60] Continuation of Ser. No. 465,528, Feb. 11, 1983, abandoned, which is a division of Ser. No. 347,009, Feb. 8, 1982, abandoned, which is a division of Ser. No. 234,905, Feb. 17, 1981, Pat. No. 4,331,583.

[51] Int. Cl.$^3$ ............................................. C08G 85/00
[52] U.S. Cl. .................................... 528/141; 526/193; 528/242; 528/408
[58] Field of Search ................. 526/193; 528/141, 242, 528/408

[56] References Cited

U.S. PATENT DOCUMENTS

| | | | |
|---|---|---|---|
| 2,601,497 | 6/1952 | Brown | 528/242 |
| 3,378,502 | 4/1968 | Ferrholz et al. | 528/242 |
| 3,451,968 | 6/1969 | Akiyama | 528/242 |
| 3,454,683 | 7/1969 | Kamp et al. | 528/242 |
| 3,535,284 | 10/1970 | Idelson et al. | 528/242 |
| 3,539,534 | 11/1970 | Manganaro et al. | 528/242 |
| 3,984,378 | 10/1976 | Kubota et al. | 528/242 |
| 4,031,036 | 6/1977 | Koshar | 528/242 |
| 4,038,198 | 7/1977 | Wagner et al. | 528/242 |

*Primary Examiner*—Joseph L. Schofer
*Assistant Examiner*—Bernard Lipman
*Attorney, Agent, or Firm*—Neuman, Williams, Anderson & Olson

[57] ABSTRACT

Catalysts for foundry core binders prepared by reacting polyphosphoric acid with an alcohol.

6 Claims, No Drawings

CATALYSTS FOR FOUNDRY CORE BINDERS

This is a continuation of application Ser. No. 465,528 filed Feb. 11, 1983, now abandoned which is a division of Ser. No. 347,009 filed Feb. 8, 1982, now abandoned, which in turn is a division of Ser. No. 234,905 filed Feb. 17, 1981, now U.S. Pat. No. 4,331,583.

This invention relates to catalysts for binders for sands which are formed into shapes and used for foundry purposes.

In present foundry practice it is customary to form a core for a casting by filling an unheated pattern cavity with a core forming material which comprises core sand mixed with a binder and a catalyst. Desirably, when the core sand is mixed and placed in the mold, rapid curing of the binder takes place which binds the core sand making a core which is easily removable from the pattern, which has high strength so as to withstand rough handling and which is stable so as to permit storage over a long period of time. A variety of binders, including furan resins, have been used for years to form foundry core sands. Similarly, aqueous solutions of phosphoric acid have been used to cure the binders on foundry sand. Generally, 70-85% solutions of phosphoric acid have been used in the art for this purpose. Although these solutions are low in cost and of relatively low toxicity, their use has been limited because of low reactivity and a relatively high crystallization point, i.e., crystals form in the solutions at relatively high ambient temperatures. Because of these deficiencies, through the years many other acids have been added to phosphoric acid to enhance reactivity as a catalyst for curing the binders. Examples of such other acids are sulfuric, toluenesulfonic and hydrofluoric acids, to mention a few. The addition of such other acids may result in an increase in reactivity, but frequently admit of disadvantages such as increased toxicity and/or extreme sensitivity to sand system variables such as temperature, moisture level and sand pH. The latter variable is extremely important since some sands are highly basic in nature and aqueous solutions of phosphoric acid are not effective to cure the binders when used on very basic foundry core sands.

A model catalyst for binders used in manufacturing foundry core sands should have a number of characteristics. Thus, the catalyst must be capable of curing the foundry binder in a reasonable length of time so as to form a shaped sand article of high strength. However, the catalyst should not be so highly reactive as to effect cure of the acid cured binder in such a short time as to make it practically impossible to shape the sand and binder mix into the desired shape. This is to say that the curing should not be so rapid as to result in very short work times of say less than 5 minutes. Preferably, longer work times are desired. Thus, the catalysts should have an attenuated degree of reactivity so as to provide reasonable work times on the order of 10 minutes or more. Another important consideration with respect to the use of acid catalysts is the viscosity of the catalyst. In practice, the liquid catalysts are applied by pouring the catalyst material on a moving bed of sand particles. For proper metering and good distribution on the individual sand particles, the viscosity of the catalyst should not be too great so as to present problems in the pumping and metering apparatus or to preclude its application in a steady stream to the sand particles. Also, a desirable catalyst for use in foundry applications should not be one which forms crystals when the ambient temperature drops to within reasonably expected ranges. Crystal formation causes difficulties in delivery and metering of the catalyst to the sand particles and very often makes difficult the application of the catalyst in the desired concentration levels. Furthermore, the catalyst should be compatible with various types of sand so as not to react excessively therewith with consequent dissipation of their curing activity. A good catalyst for foundry binders is one which is capable of absorbing surface moisture from the sand particles so as to insure good distribution of the binder over the individual sand particles as is necessary for high strength in the finished shaped core.

It is a principal object of this invention to provide catalyst systems useful for curing foundry sand binders.

It is another object of this invention to provide catalysts for curing foundry sand binders having the discussed attributes of a model catalyst.

It is another object of this invention to provide catalyst systems useful for curing binders on foundry sands which may be slightly acidic, neutral or highly basic in character.

It is still another object of this invention to provide improved binder and catalyst systems for use with foundry sands.

It is a further object of this invention to provide catalyst systems which offer good curing characteristics for furan based binders without sacrifice of strength.

Yet another object of this invention is to provide a method of curing a binder for foundry core sands and of making sand cores for use in foundry applications.

The novel and advantageous catalysts for foundry sand binders in accordance with this invention are prepared by reacting polyphosphoric acid with an alcohol. Polyphosphoric acid is a known, commercially available chemical, available commercially from Stauffer Chemical Company. The Merck Index, 8th Edition, page 848 describes polyphosphoric acid as a viscous liquid at room temperature consisting of about 55% tripolyphosphoric acid, the remainder being $H_3PO_4$ and other polyphosphoric acids. It is also known as phospholeum or tetraphosphoric acid and has a typical analysis of 83% $P_2O_5$ with an ortho equivalent of 115.0%.

The alcohols which are reacted with the polyphosphoric acid are aliphatic (branched and unbranched), alkenyl (conjugated and unconjugated), aromatic and heterocyclic alcohols containing not more than 12 carbon atoms. Particularly preferred alcohols are the alcohols containing not more than 5 carbon atoms; representative of which are methanol, ethanol, 1-propanol, 2-propanol, 1-butanol, 2-butanol, isobutanol, tertiary butanol, 1-pentanol and mixtures thereof.

The catalysts of the invention are prepared by adding from about 5 to 25% by weight of an alcohol or alcohol mixture to the polyphosphoric acid with mechanical stirring. The reaction of the alcohol and polyphosphoric acid is exothermic in nature and the temperature of the reaction mixture will rise initially. While the reaction temperature during the addition of the alcohol is not critical, it is preferable and convenient to maintain the reaction mixture under reflux at a temperature approximating that reached exothermally, say from 75° to 120° C. After the addition, the reaction mixture is heated under reflux conditions at a temperature of 95° to 140° C. for about 1 to 3 hours. After the reaction is complete, the reaction product, without further treatment or purification, is recovered and cooled if necessary. The reaction product can be stored for use as a catalyst. The liquid catalyst of this invention is believed to comprise a mixture of phosphates, phosphoric acid and polyphosphoric acid and has a much lower viscosity than the starting polyphosphoric acid. For example, polyphosphoric acid has a viscosity of about 100,000 centipoises at 20° C. whereas the reaction product of 80 parts thereof with 20 parts of methanol has a viscosity of about 600 centipoises at 20° C.

The catalysts of this invention are used with the various acid curable thermosetting binders known to the art, such as phenol-aldehyde resins, urea-aldehyde resins, furan resins, e.g. furfuryl alcohol-urea resins, furfuryl alcohol-formaldehyde resins, furfuryl alcohol-resorcinol resins, furfuryl alcohol-melamine resins, furfuryl alcohol polymers, polymers of furfuraldehyde and the like.

The acid cured thermosetting binders are applied to aggregate materials in conventional manner and are acid catalyzed to form a rigid material. The catalysts can be applied to the sand followed by application of the binder thereto. The acid catalysts are used in amounts ranging from about 10 to 50% by weight of the binder material and in a Brookfield viscosity range of from about 40 to 2000 centipoises. Curing of the binder-catalyst system is accomplished at room temperature.

The amount of binder which is used in the acid hardenable mix is actually determined by the surface area of the sand to be used, and, for example, sand mixes which have incorporated therein an acid curable thermosetting binder in an amount from 0.5 to about 5.0 percent by weight of the sand are, generally speaking, satisfactory in accordance with the present invention.

The catalysts are useful with the thermosetting binders to prepare shaped articles from sands of all types, irrespective of the pH characteristics of the sand. Thus, core sands for metal foundry utilization can be made from neutral or slightly acidic sands such as pure quartz sand (~99% silica), lake sand (~95% silica), chromite sand, zircon sand or basic sands such as olivine sand and sea sand. The expression "core sand" is used herein to include sand used in making shapes of all sorts for foundry purposes, including sand shapes which are to be used as mold cores, sand shapes useful in other casting processes, including sand shapes which are made in patterns and cured therein as well as free standing sand shapes for any desirable purpose in foundry work.

Unexpectedly, and of great advantage, is the fact that the catalysts of this invention effectively provide shaped sand articles of good strength when highly basic sands such as olivine sands are employed as substrate. Olivine sands usually contain about 50% magnesium oxide and because of their basic nature have been thought to rapidly neutralize acidic catalysts thus preventing satisfactory cure of the acid curable thermosetting binder materials to a rigid condition. This has usually precluded the use of acid catalysts such as phosphoric acid ($H_3PO_4$) with basic sands of the olivine type. For reasons not presently known, the catalysts of this invention can be effectively used to cure acid curable thermosetting binders when used on sand substrates which are highly basic. This unexpected advantage is important as it permits the fabrication of core sands for foundry use utilizing olivine sands which have certain recognized metallurgical advantages. Olivine sands generally have a relatively low coefficient of expansion and are desired for use in metal foundry operations where the metal being cast into sand shapes is at a very high temperature. Also, olivine sand is desired for use in operations where metal alloys containing manganese are being cast since olivine sand does not react with manganese. Accordingly, in one preferred embodiment of this invention, the catalyst-binder systems disclosed herein are used to prepare shaped sand articles from olivine sands.

When using the binder-catalyst system of this invention in producing core sands, it is generally preferred to use with the binder-catalyst system a silane adhesion promoter in an amount ranging from about 0.1% to 3% based on the weight of the binder. Such silane adhesion promoters are well known in the art and include for example, gamma-mercaptopropyltrimethoxysilane, N-beta-(aminoethyl)-gamma-aminopropyltrimethoxysilane, beta-(3,4-epoxycyclohexyl)-ethyltrimethoxysilane, gamma-glycidoxypropyltrimethoxysilane, gamma-aminopropyltriphenoxysilane, gamma-aminopropyltribenzoyoxysilane, gamma-aminopropyltrifuroxysilane, gamma-aminopropyltri (o-chlorophenoxy)silane, gamma-aminopropyltri (p-chlorophenoxy)silane, gamma-aminopropyltri(tetrahydrofurfuroxy)silane, methyl[2-gamma-triethoxysilypropyl-amino]ethylamino]3-propionate in methanol, modified aminoorganosilane, Ureido-silane, mercaptoethyltriethoxysilane, chloropropyltrimethoxysilane, vinyltrichlorosilane, vinyltriethoxysilane, vinyltrimethoxysilane, gamma-methacryloxypropyltrimethoxysilane, gamma-methacryloxypropyltri(2-methoxyethoxy)silane, gamma-glycidoxypropyltrimethoxysilane, vinyltriacetoxysilane, gamma-mercaptopropyltrimethoxysilane, gamma-aminopropyltriethoxysilane, N-beta(aminoethyl)-gamma-amino-propyltrimethoxysilane.

Certain test methods may be used to predict accurately the effectiveness with which a binder-catalyst system may be used in a foundry environment. These tests will generally indicate the ultimate strength and uniformity of the final sand product and the work time within which the sand-binder-catalyst mix can be handled and shaped. In making the tests set forth herein to determine the strength which the sand product possesses, a so-called "biscuit" or briquette of sand of one inch cross-section was made. The "biscuit" is a formation of sand shaped in a characteristic way (a "dog bone" shape) and bonded by the binder/catalyst system being tested. After the so-called biscuit is formed, it is placed in a machine adapted to determine what the tensile and ultimate yield strengths of the part thus formed are. The shape of a typical briquette or biscuit is well known to those skilled in the art and accordingly, the characteristics thereof are not discussed further herein; for example, however, reference is made to such typical biscuit in a book entitled *Steel Foundry Practice*, by J. H. Hall, (Penton Publishing Co., Cleveland, Ohio, 1950) where such unit is shown and described on page 8.

Scratch hardness indicates how hard the surface of the test specimen is.

The work time or working life is the point after mixing during which acceptable cores can be made.

The strip time is the period required to produce a core that is sufficiently hard to resist distortion upon withdrawal from the core box.

The cup cure data set forth herein was determined by placing sand in a paper drinking cup and squeezing from time to time to feel when rigidity sets in.

The advantages of the invention will be further apparent from the following examples and data.

EXAMPLE 1

Polyphosphoric acid (75 parts, 115% ortho equivalent is charged into a flask equipped with a mechanical stirrer, thermometer and condenser. 1-Pentanol (25 parts) is added dropwise over a period of 30 minutes. The reaction is exothermic. During the addition the temperature of the reaction mixture is kept at 85° C. After the addition the reaction mixture is heated to 100° C. and maintained at that temperature for 1 hour. The reaction product is cooled to ambient temperature and is ready for use as a catalyst.

EXAMPLE 2

Polyphosphoric acid (90 parts, 115% ortho equivalent is charged into a flask equipped with a mechanical stirrer, thermometer and condenser. 2-Butanol (10 parts) is added dropwise over a period of 30 minutes. The reaction is exothermic. During the addition the temperature of the reaction mixture is kept at 85° C. After the addition the reaction mixture is heated to 100° C. and maintained at that temperature for 1 hour. The reaction product is cooled to ambient temperature and is ready for use as a catalyst.

EXAMPLE 3

Polyphosphoric acid (95 parts, 115% ortho equivalent) is charged into a flask equipped with a mechanical stirrer, thermometer and condenser. Ethanol (5 parts) is added dropwise over a period of 30 minutes. The reaction is exothermic. During the addition the temperature of the reaction mixture is kept at 85° C. After the addition the reaction mixture is heated to 100° C. and maintained at that temperature for 1 hour. The reaction product is cooled to ambient temperature and is ready for use as a catalyst.

EXAMPLE 4

Polyphosphoric acid (85 parts, 115% ortho equivalent) is charged into a flask equipped with a mechanical stirrer, thermometer and condenser. 1-Propanol (15 parts) is added dropwise over a period of 30 minutes. The reaction is exothermic. During the addition the temperature of the reaction mixture is kept at 85° C. After the addition the reaction mixture is heated to 100° C. and maintained at that temperature for 1 hour. The reaction product is cooled to ambient temperature and is ready for use as a catalyst.

EXAMPLE 5

Polyphosphoric acid (80 parts, 115% ortho equivalent is charged into a flask equipped with a mechanical stirrer, thermometer and condenser. Methanol (20 parts) is added dropwise over a period of 30 minutes. The reaction is exothermic. During the addition the temperature of the reaction mixture is kept at 85° C. After the addition the reaction mixture is heated to 100° C. and maintained at that temperature for 1 hour. The reaction product is cooled to ambient temperature and is ready for use as a catalyst. The reaction product catalyst is found to have a Brookfield viscosity of about 600 centipoises at room temperature.

EXAMPLE 6

Polyphosphoric acid (90 parts, 115% ortho equivalent) is charged into a flask equipped with a mechanical stirrer, thermometer and condenser. Tertiary butanol (10 parts) is added dropwise over a period of 30 minutes. The reaction is exothermic. During the addition the temperature of the reaction mixture is kept at 85° C. After the addition the reaction mixture is heated to 100° C. and maintained at that temperature for 1 hour. The reaction product is cooled to ambient temperature and is ready for use as a catalyst.

EXAMPLE 7

Polyphosphoric acid (85 parts, 115% ortho equivalent) is charged into a flask equipped with a mechanical stirrer, thermometer and condenser. Anhydrous methanol (15 parts) is added dropwise over a period of 30 minutes. The reaction is exothermic. During the addition the temperature of the reaction mixture is kept at 85° C. After the addition the reaction mixture is heated to 100° C. and maintained at that temperature for 1 hour. The reaction product is cooled to ambient temperature and is ready for use as a catalyst.

EXAMPLE 8

This example provides data with respect to various foundry sand binders and various acid catalysts using Olivine 70 sand as substrate. All binders had admixed therewith 0.3% A1160 prior to use.

TABLE I

| Binder | % Brinder/Sand | Catalyst Type | % Catalyst/Binder | Work Time (min) | Strip Time | Tensile Strength (psi) |
|---|---|---|---|---|---|---|
| A200 | 2 | $P_2O_5$ | 10 | Very fast - Overcured | | None |
| | | BSA-75 | 40 | No cure | | " |
| | | TSA-65 | 40 | " | | " |
| | | PSA-65 | 40 | " | | " |
| | | XSA-90 | 40 | " | | " |
| A200 | 2 | BSA-75 | 80 | Some Cure | | " |
| | | TSA-65 | 80 | " | | " |
| | | PSA-65 | 80 | " | | " |
| | | XSA-90 | 80 | " | | " |
| | | Phosphoric-85 | 80 | " | | " |
| A200 | 2 | PPAM 8020 | 30 | No Cure | | None |
| | | | 40 | 25 | 75 | 245 |
| | | | 50 | 10 | 30 | 240 |
| A200 | 2 | PPAM 8515 | 30 | 20 | 45 | 130 |
| | | | 40 | 14 | 35 | 170 |
| Kordell JetSet ® 5 | 2 | PPAM 8020 | 50 | 12 | 30 | 180 |
| FA ® R | 2 | | 50 | 14 | 35 | 120 |
| FD35904 | 2 | | 50 | 15 | 30 | 220 |
| FB800 | 2 | | 50 | 18 | 40 | 138 |
| FD35904 | 2 | PPAP 7525 | 50 | 20 | 120 | 140 |

TABLE I-continued

| Binder | % Brinder/ Sand. | Catalyst Type | % Catalyst/ Binder | Work Time (min) | Strip Time | Tensile Strength (psi) |
|---|---|---|---|---|---|---|
| | 2 | PPAB 7129 | 50 | 45 | 180 | 138 |
| | 2 | PPAIP 7525 | 50 | 40 | 160 | 155 |

EXAMPLE 9

This example provides data with respect to the use of various sands as substrates.

TABLE II

| Sand Type | Binder | % Binder/ Sand | Catalyst | % Catalyst/ Binder | Work Time (min) | Strip Time (min) | Tensile Strength (psi) |
|---|---|---|---|---|---|---|---|
| Pure Quartz | A200 | 2 | PPAM 8020 | 30 | 12 | 30 | 600 |
| Lake Sand (94% SiO$_2$) | " | 2 | " | 30 | 20 | 45 | 400 |
| Chromite | " | 2 | " | 30 | 15 | 40 | 350 |
| Zircon | " | 2 | " | 30 | 12 | 32 | 380 |
| Olivine 70 | " | 2 | " | 50 | 10 | 30 | 240 |

Definitions for Tables IV and V:
Catalysts:
P$_2$O$_5$ Phosphorus Pentoxide
BSA-75 75% Aqueous Benzenesulfonic Acid
TSA-65 65% Aqueous Toluenesulfonic Acid
PSA-65 65% Aqueous Phenolsulfonic Acid
XSA-90 90% Aqueous Xylenesulfonic Acid
Phosphoric-85 85% Aqueous Phosphoric Acid
PPAM 8020 Reaction Product 80% Polyphosphoric Acid and 20% Methanol
PPAM 8515 Reaction Product 85% Polyphosphoric Acid and 15% Methanol
PPAP 7525 Reaction Product 75% Polyphosphoric Acid and 25% n-Propanol
PPAB 7129 Reaction Product 71% Polyphosphoric Acid and 29% n-Butanol
PPAIP 7525 Reaction Product 75% Polyphosphoric Acid and 25% Isopropanol
Binders:
A200 Ashland Chemical Co. Proprietary Furfuryl Alcohol Binder
JetSet ® 5 Kordell Chemical Co. Proprietary Furfuryl Alcohol Binder
FA ® R Furfuryl Alcohol/Resorcinol Binder
FB-800 Furfuryl Alcohol/Phenolic/Urea Formaldehyde Binder
FD35904 Furfuryl Alcohol/Resorcinol/Urea Formaldehyde Binder This invention provides foundry sand binder/catalyst systems having significant advantages. The binder/catalyst systems of the invention can be used to produce cores from sands of varying pH characteristics, including highly basic sands. The disclosed catalysts have desired reactivity characteristics which provide adequate work time while producing strong, rigid cores in practical time periods. The catalysts are liquids and exhibit relatively low viscosities which enable them to be delivered to and controllably metered onto individual sand particles.

The catalysts of this invention can be used with acid cured thermosetting binders for producing shaped composite articles, other than foundry core sands, such as particle board, fiberglass board, acoustical tile and the like in which good bonding and tensile strength is required.

Those modifications and equivalents which fall within the spirit of the invention are to be considered a part thereof.

What is claimed is:

1. A process for curing an acid curable thermosetting resin selected from the group consisting of phenolaldehyde resins, urea-aldehyde resins, furfuryl alcohol-urea resins, furfuryl alcohol-formaldehyde resins, furfuryl alcohol-resorcinol resins, furfuryl alcohol-melamine resins, furfuryl alcohol polymers and polymers of furfuraldehyde which comprises contacting said resin with a catalyst comprising the reaction product of polyphosphoric acid and an aliphatic alcohol containing not more than 12 carbon atoms.

2. A process according to claim 1 wherein the alcohol is an aliphatic alcohol containing not more than 5 carbon atoms.

3. A process according to claim 1 wherein the alcohol is methanol.

4. A binder composition comprising an acid curable thermosetting resin selected from the group consisting of phenolaldehyde resins, urea-aldehyde resins, furfuryl alcohol-urea resins, furfuryl alcohol-formaldehyde resins, furfuryl acohol-resorcinol resins, furfuryl alcohol-melamine resins, furfuryl alcohol polymers and polymers of furfuraldehyde and a catalyst therefor comprising the reaction product of polyphosphoric acid and an aliphatic alcohol containing not more than 12 carbon atoms.

5. A binder composition in accordance with claim 4 wherein the alcohol is an aliphatic alcohol containing not more than 5 carbon atoms.

6. A binder composition in accordance with claim 4 wherein the alcohol is methanol.

* * * * *